(12) United States Patent
Wang

(10) Patent No.: US 11,996,870 B2
(45) Date of Patent: May 28, 2024

(54) TERMINAL

(71) Applicant: VIVO MOBILE COMMUNICATION CO., LTD., Guangdong (CN)

(72) Inventor: Lirong Wang, Guangdong (CN)

(73) Assignee: Vivo Mobile Communication Co., Ltd., Guangdong (CN)

( * ) Notice: Subject to any disclaimer, the term of this patent is extended or adjusted under 35 U.S.C. 154(b) by 311 days.

(21) Appl. No.: 17/528,348

(22) Filed: Nov. 17, 2021

(65) Prior Publication Data

US 2022/0077880 A1 Mar. 10, 2022

Related U.S. Application Data

(63) Continuation of application No. PCT/CN2020/081034, filed on Mar. 25, 2020.

(30) Foreign Application Priority Data

May 20, 2019 (CN) .......................... 201910418743.3

(51) Int. Cl.
*H04B 1/00* (2006.01)
*H01Q 1/24* (2006.01)
*H04B 1/40* (2015.01)

(52) U.S. Cl.
CPC ........... *H04B 1/0064* (2013.01); *H01Q 1/241* (2013.01); *H04B 1/40* (2013.01)

(58) Field of Classification Search
CPC ...... H04B 1/0064; H04B 1/40; H04B 1/0067; H01Q 1/241; H01Q 1/243; H04M 1/026; H04M 1/0274; H04M 1/0277

USPC ...................................................... 455/552.1
See application file for complete search history.

(56) References Cited

U.S. PATENT DOCUMENTS

| | | |
|---|---|---|
| 2012/0112969 A1 | 5/2012 | Caballero et al. |
| 2013/0207854 A1 | 8/2013 | Ryu |
| 2013/0242796 A1 | 9/2013 | Chen et al. |
| 2014/0112511 A1* | 4/2014 | Corbin ................... H05K 9/006 343/702 |
| 2019/0027804 A1 | 1/2019 | Kim et al. |
| 2019/0057924 A1 | 2/2019 | Kim et al. |
| 2019/0058244 A1 | 2/2019 | Kim et al. |
| 2019/0081694 A1 | 3/2019 | Zhou et al. |
| 2020/0052368 A1 | 2/2020 | Xia et al. |

FOREIGN PATENT DOCUMENTS

| | | |
|---|---|---|
| CN | 201039143 Y | 3/2008 |
| CN | 203884074 U | 10/2014 |
| CN | 204350078 U | 5/2015 |
| CN | 105552529 A | 5/2016 |
| CN | 205212825 U | 5/2016 |
| CN | 106898867 A | 6/2017 |

(Continued)

*Primary Examiner* — Eugene Yun
(74) *Attorney, Agent, or Firm* — Price Heneveld LLP

(57) ABSTRACT

The present application relates to a terminal, including: a main board, a middle frame, a radio frequency circuit layer, a screen, and a plurality of antennas, where the middle frame is located between the main board and the radio frequency circuit layer, the radio frequency circuit layer is located between the screen and the middle frame, and the plurality of antennas are connected to the main board by using radio frequency lines in the radio frequency circuit layer.

12 Claims, 5 Drawing Sheets

(56) References Cited

FOREIGN PATENT DOCUMENTS

| | | | |
|---|---|---|---|
| CN | 107742777 | A | 2/2018 |
| CN | 207265217 | U | 4/2018 |
| CN | 108321524 | A | 7/2018 |
| CN | 109119768 | A | 1/2019 |
| CN | 109273823 | A | 1/2019 |
| CN | 208489355 | U | 2/2019 |
| CN | 109411423 | A | 3/2019 |
| CN | 110138391 | A | 8/2019 |
| JP | 10215085 | A | 8/1998 |
| JP | 2009100440 | A | 5/2009 |
| JP | 2014501070 | A | 1/2014 |
| JP | 2014501470 | A | 1/2014 |
| WO | 2017008247 | A1 | 1/2017 |
| WO | 2018216556 | A1 | 11/2018 |

* cited by examiner

TERMINAL

CROSS-REFERENCE TO RELATED APPLICATIONS

This application is a continuation application of PCT International Application No. PCT/CN2020/081034 filed on Mar. 25, 2020, which claims priority to Chinese Patent Application No. 201910418743.3, filed in China on May 20, 2019. The disclosures of these applications are incorporated herein by reference in their entireties.

TECHNICAL FIELD

The present disclosure relates to the technical field of electronic products, and in particular, to a terminal.

BACKGROUND

With the development of communications technologies, a transmission speed of a mobile network becomes increasingly fast. In order to achieve a higher speed and support a multi-mode system, a quantity of integrated antennas on a terminal is also increasing, and it is increasingly difficult to integrate more antennas under a limited volume of the terminal.

Currently, most terminals use a middle frame as an antenna. In order to meet a quantity requirement of antennas in a 5G communications technology, antennas may need to be provided on the periphery of the middle frame. An antenna feed point needs to be connected to a main board. If the antenna feed point is far away from the main board, the mainboard needs to be connected to the antenna feed point by using a radio frequency coaxial line. In this way, as the quantity of antennas increases, a quantity of radio frequency coaxial lines also increases. In addition, a small antenna panel generally needs to be added within a predetermined distance of the antenna feed point. The small antenna panel is equipped with a coaxial line holder, an antenna spring, an antenna tuning switch, and other devices. In this way, each additional antenna needs to occupy a large amount of structural space. A larger quantity of antennas requires more structure space for a coaxial line to be added inside the terminal. The larger the structure space occupied, the less conducive to internal space layout of the terminal. In addition, a larger quantity of antennas requires more springs for connecting with the middle frame. The antenna spring needs to be in reliable contact, otherwise antenna performance will deteriorate. A larger quantity of antenna springs may reduce the contact reliability and even affect the antenna performance.

SUMMARY

Embodiments of the present disclosure provide a terminal, to resolve a problem that large internal space of the terminal is occupied due to increase of a quantity of antennas.

To resolve the foregoing technical problem, the present disclosure is implemented as follows.

According to a first aspect, an embodiment of the present disclosure provides a terminal, including: a main board, a middle frame, a radio frequency circuit layer, a screen, and a plurality of antennas, where the middle frame is located between the main board and the radio frequency circuit layer, the radio frequency circuit layer is located between the screen and the middle frame, and the plurality of antennas are connected to the main board by using radio frequency lines in the radio frequency circuit layer.

In this way, in the foregoing solution of the present disclosure, the antennas in the terminal are connected to the main board by using the radio frequency lines in the radio frequency circuit layer disposed between the screen and the middle frame of the terminal, so as to ensure that an antenna at any position can be connected to the radio frequency circuit layer directly or by using a relatively short line, avoiding a problem that large internal space of the terminal is occupied by connection of a radio frequency coaxial line to an antenna feed point because there are a large quantity of antennas and the antennas are far away from the main board.

BRIEF DESCRIPTION OF DRAWINGS

To describe the technical solutions in the embodiments of the present disclosure more clearly, the following briefly describes the accompanying drawings required for describing the embodiments of the present disclosure. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

Exemplary embodiments of the present disclosure will be described below in further detail with reference to the accompanying drawings. Although the accompanying drawings show exemplary embodiments of the present disclosure, it should be understood that the present disclosure can be implemented in various forms and shall not be limited by embodiments described herein. On the contrary, the embodiments are provided to enable a more thorough understanding of the present disclosure convey the scope of the present disclosure to a person skilled in the art.

Figure 1:
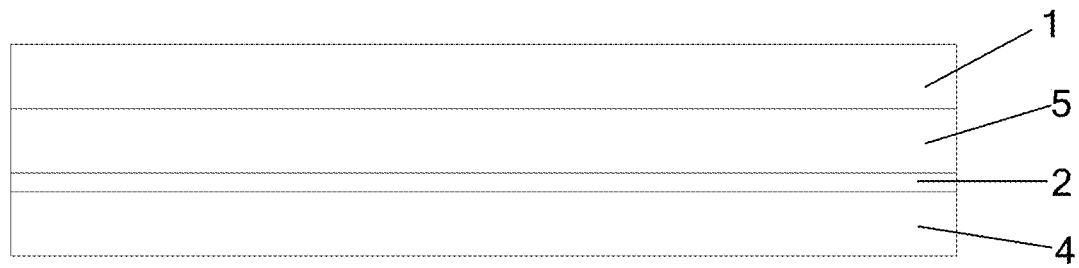
FIG. 1 is a first schematic diagram of a terminal according to an embodiment of the present disclosure.
Figure 2:
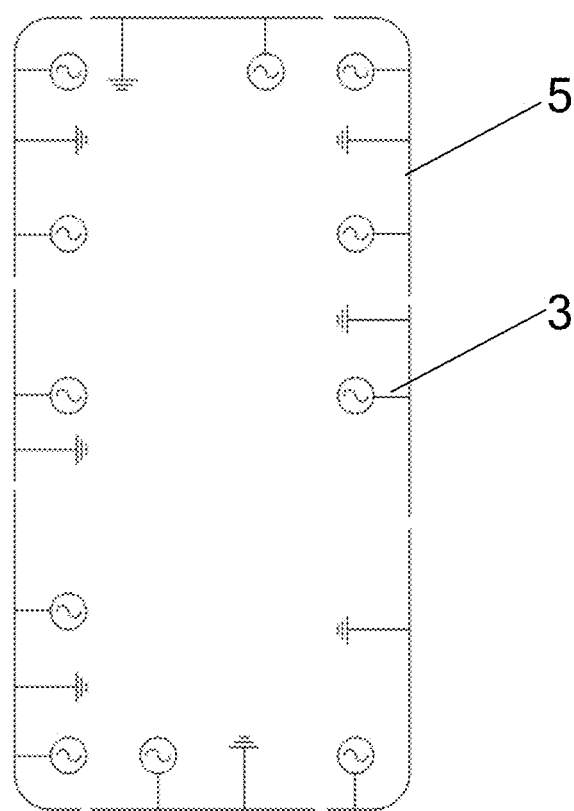
FIG. 2 is a schematic diagram of antennas in a terminal according to an embodiment of the present disclosure.

As shown in FIG. 1 and FIG. 2, an embodiment of the present disclosure provides a terminal, including: a main board 1, a middle frame 5, a radio frequency circuit layer 2, a screen 4, and a plurality of antennas 3.

The middle frame 5 is located between the main board 1 and the radio frequency circuit layer 2, the radio frequency circuit layer 2 is located between the screen 4 and the middle frame 5, and the plurality of antennas 3 are connected to the main board 1 by using radio frequency lines in the radio frequency circuit layer 2.

In this embodiment, the middle frame 5 is located between the main board 1 and the radio frequency circuit layer 2, and the radio frequency circuit layer 2 is located between the screen 4 and the middle frame 5. The antennas 3 in the terminal are connected to the main board 1 by using the radio frequency circuit layer 2 disposed between the middle frame 5 and the screen 4 of the terminal, so as to ensure that an antenna at any position can be connected to the radio frequency circuit layer directly or by using a relatively short line, avoiding a problem that large internal space of the terminal is occupied by connection of a radio frequency coaxial line to an antenna feed point because there are a large quantity of antennas and the antennas are far away from the main board.

Optionally, the radio frequency circuit layer 2 is separately adhered to the screen 4 and the middle frame 5 of the terminal by glue to avoid space occupation caused by screw positioning.

Optionally, the radio frequency circuit layer 2 may alternatively be connected to the screen 4 by using foam, so as to provide support for the radio frequency circuit layer 2 through the foam.

Specifically, the main board 1 is located above the middle frame 5, that is, the main board 1 is located on a side, opposite to a side where the radio frequency circuit layer 2 is located, of the middle frame 5. The antennas 3 are disposed on the middle frame 5, and the plurality of antennas 3 may be disposed around the edge of the screen 4 (as shown in FIG. 2). To ensure that an antenna at any position can be connected to the radio frequency circuit layer directly or by using a relatively short line, the radio frequency circuit layer 2 can be disposed to at least partially cover an area of the screen 4 at a predetermined distance from the edge of the screen.

Figure 3:
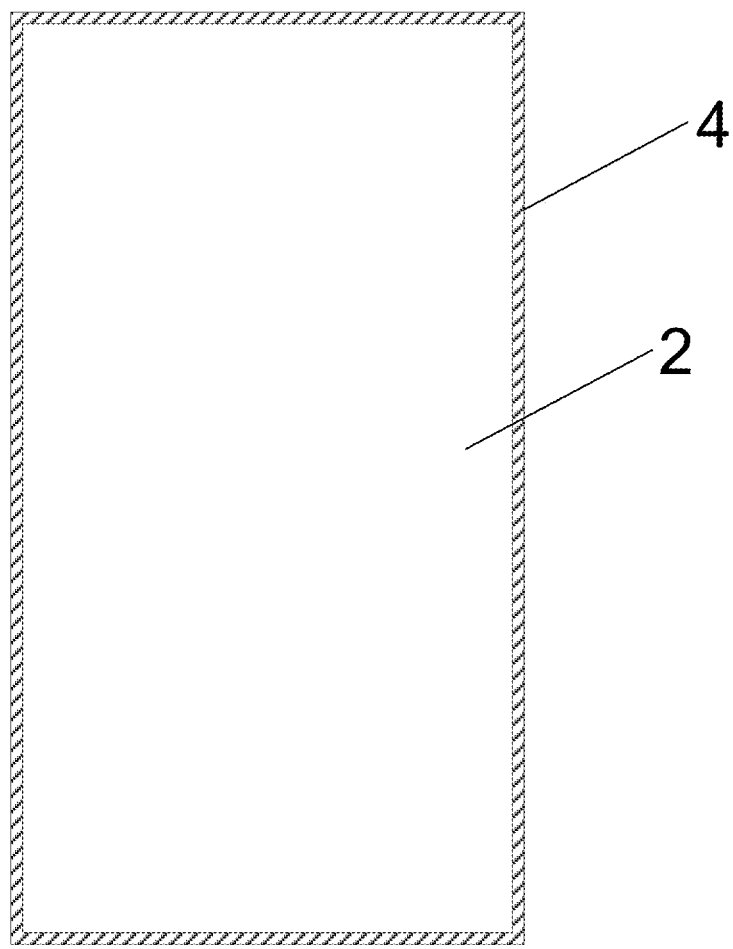
FIG. 3 is a first schematic diagram of a radio frequency circuit layer according to an embodiment of the present disclosure.

As shown in FIG. 3, as an implementation, the radio frequency circuit layer 2 covers the entire area of the screen 4.

In this embodiment, the plurality of antennas 3 are disposed around the edge of the screen 4, and the radio frequency circuit layer 2 covers the entire area of the screen 4, so as to ensure that an antenna 3 at any position can be connected to the radio frequency circuit layer 2 directly or by using a relatively short line, avoiding a problem that large internal space of the terminal is occupied by connection of a radio frequency coaxial line to an antenna feed point because there are a large quantity of antennas 3 and the antennas 3 are far away from the main board 1.

Figure 4:
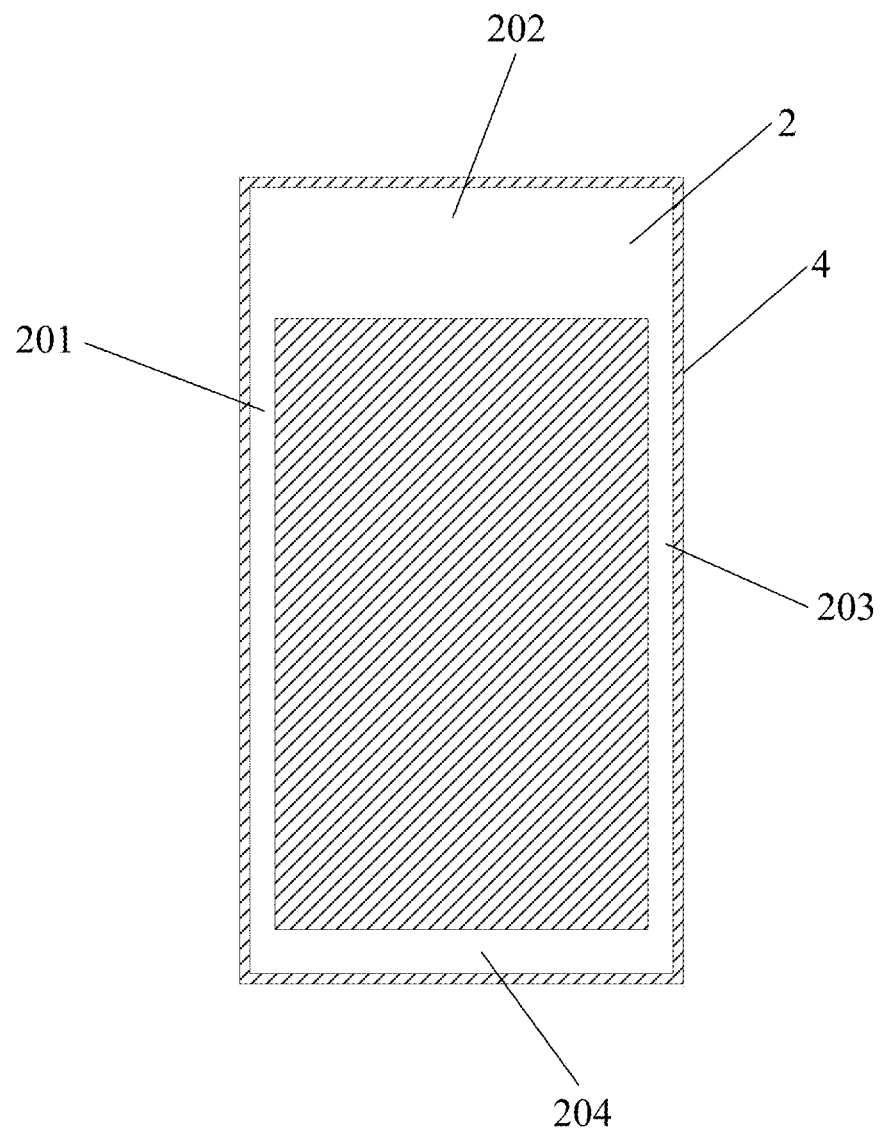
FIG. 4 is a second schematic diagram of a radio frequency circuit layer according to an embodiment of the present disclosure.

As shown in FIG. 4, as another implementation, the radio frequency circuit layer 2 covers an area on the screen 4 at a predetermined distance from the edge of the screen.

Optionally, the radio frequency circuit layer 2 includes a first sub-board 201, a second sub-board 202, a third sub-board 203, and a fourth sub-board 204. The radio frequency circuit layer 2 is in a frame-shaped structure enclosed by the first sub-board 201, the second sub-board 202, the third sub-board 203, and the fourth sub-board 204.

It should be noted that FIG. 4 shows an example in which the shape of the radio frequency circuit layer 2 is a rectangular frame. In addition, the shape of the radio frequency circuit layer 2 may alternatively be another shape, such as an irregularly polygonal frame. The specific shape of the radio frequency circuit layer 2 can be determined according to actual layout requirements of the antennas 3, which is not limited in the present disclosure.

In this embodiment, the radio frequency circuit layer 2 covers the area of the screen 4 at a predetermined distance from the edge of the screen, to ensure that an antenna 3 at any position can be connected to the radio frequency circuit layer 2 directly or by using a relatively short line, avoiding a case that large internal space of the terminal is occupied by connection of a radio frequency coaxial line to an antenna feed point because there are a large quantity of antennas 3 and the antennas 3 are far away from the main board 1. In addition, a material used for the radio frequency circuit layer 2 can be reduced to lower costs.

Figure 5:
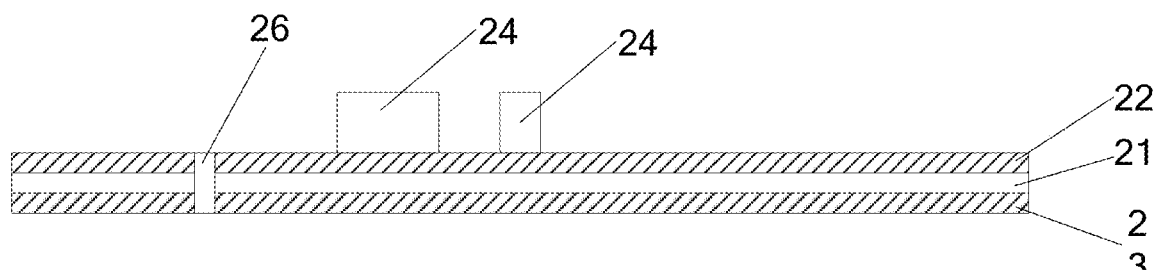
FIG. 5 is a first schematic structural diagram of a radio frequency circuit layer according to an embodiment of the present disclosure.

Specifically, as shown in FIG. 5, the radio frequency circuit layer 2 includes: a radio frequency wiring layer 21 provided with a plurality of radio frequency lines, a first ground layer 22 located on a first surface of the radio frequency wiring layer 21, and a second ground layer 23 located on a second side of the radio frequency wiring layer 21.

Each of the antennas 3 is connected to the main board 1 by using a corresponding radio frequency line, that is, one of the antennas 3 is connected to the main board 1 by using one of the radio frequency lines; the first ground layer 22 is connected to the middle frame 5; and the second ground layer 23 is connected to the screen 4.

Optionally, the first ground layer 22 and the middle frame 5 are glued together, and the second ground layer 23 and the screen 4 are glued together to avoid internal space occupation of the terminal caused by screw positioning.

Optionally, the radio frequency circuit layer 2 may be a radio frequency circuit board. The radio frequency wiring layer 21 uses a material with low dielectric loss, such as a liquid crystal polymer (Liquid Crystal Polymer, LCP) soft board, to ensure that loss is low during transmission of a high-frequency signal. In addition, the material can be bent, which can ensure that the material is also suitable for a terminal with a foldable screen.

Optionally, the first ground layer 22 and the second ground layer 23 may also be provided with a wiring of an electronic component 24 (for example, an antenna tuner), and the electronic component 24 may be welded to the wiring. The radio frequency wiring layer 21, the first ground layer 22, and the second ground layer 23 form the radio frequency circuit layer 2 with a strip line structure to ensure that impedance of radio frequency lines in the radio frequency wiring layer 21 is continuous and the impedance can be controlled at 50 ohms.

The following describes connection modes of the radio frequency circuit layer 2 and the antennas 3 disposed on the middle frame 5 with reference to specific examples.

Figure 6:
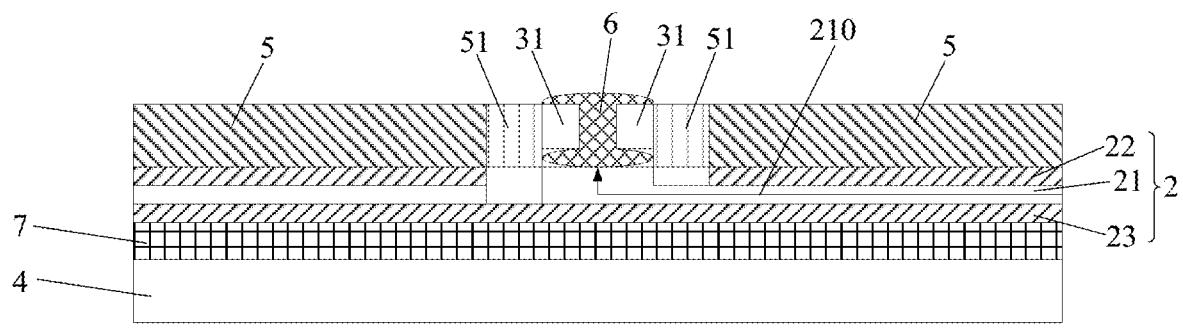
FIG. 6 is a first schematic diagram showing that a radio frequency circuit layer is connected to an antenna according to an embodiment of the present disclosure.

Example 1: As shown in FIG. 6, the middle frame 5 is provided with a first through hole, and an antenna feed point 31 of the antenna 3 is disposed on the inner wall of the first through hole. Optionally, the antenna feed point 31 is disposed on the inner wall of the first through hole by using plastic 51, and there is a gap between the antenna feed point 31 and the radio frequency line 210.

The radio frequency circuit layer 2 is provided with a first opening, and the radio frequency line 210 passes through the first opening and is connected to the antenna feed point 31.

Optionally, the radio frequency line 210 passes through the first opening and is connected to the antenna feed point 31 by using silver glue 6.

Optionally, when the radio frequency line 210 passes through the first opening and is connected to the antenna feed point 31 by using the silver glue 6, the first opening is an opening that penetrates the first ground layer 22, where the first ground layer 22 is connected to the middle frame 5. The first through hole is filled with the silver glue 6, and the radio frequency line 210 passes through the first opening and is connected to the antenna feed point 31 by using the silver glue 6. In this way, the first opening penetrates only the first ground layer 22 to ensure the reliability of a structure of the radio frequency circuit layer 2.

Specifically, a hole is formed in the middle of a metal middle frame 5 to form a first through hole. The antenna feed point 31 is disposed on the inner wall of the first through hole, and there is a gap between the antenna feed point 31 and the radio frequency line 210, to form a first filling space for the silver glue 6, so that the silver glue 6 can be electrically connected to the radio frequency line 210, thereby ensuring that the radio frequency line 210 can be electrically connected to the antenna feed point 31 by using the silver glue 6.

Optionally, a second filling space for filling with the silver glue 6 is reserved in the first through hole, and at least one conductive part of the antenna feed point 31 should be exposed in the second filling space, so that the silver glue 6 filled in the second filling space can be connected to the conductive part of the antenna feed point 31, thereby ensuring that the radio frequency line 210 can be electrically connected to the antenna feed point 31 by using the silver glue 6.

The radio frequency circuit layer 2 is disposed on the screen 4, for example, the second ground layer 23 is connected to the screen 4; and the middle frame 5 is disposed on the radio frequency circuit layer 2, for example, the first ground layer 22 is connected to the middle frame 5. After both the radio frequency circuit layer 2 and the screen 4 are assembled to the middle frame 5, the first through hole is filled with the conductive silver glue 6 from a side, away from the radio frequency circuit layer 2, of the middle frame 5, so that the conductive silver glue 6 and the antenna feed point 31 are connected to the radio frequency line 210 in the first opening, thereby implementing electrical connection between the antenna feed point 31 and the radio frequency line 210 by using the silver glue 6.

Further, the radio frequency circuit layer 2 is also connected to the screen 4 by using foam 7, so that the foam 7 provides a supporting force between the radio frequency circuit layer 2 and the middle frame 5. Even if the injected silver glue 6 has a margin, there is also a supporting force at the bottom of the radio frequency circuit layer 2, so that the antenna feed point 31 and the radio frequency line 210 are in good contact.

In this embodiment, differing from a manner in which the antenna feed point 31 and the radio frequency line 210 are electrically connected by using a shrapnel, a manner in which the antenna feed point 31 and the radio frequency line 210 are electrically connected by using the silver glue 6 has the advantages that: a contact area between the radio frequency line 210 and the antenna feed point 31 is larger, and the path is shorter, to avoid an unreliable contact of the antenna 3 due to a small contact area caused by the shrapnel, and avoid that the antenna performance is affected by a parasitic parameter caused by a longer contact path between the radio frequency line 210 and the antenna feed point 31, thereby guaranteeing the reliability of connection between the antenna 3 and the radio frequency line layer 2, and further guaranteeing the antenna performance.

Figure 7:
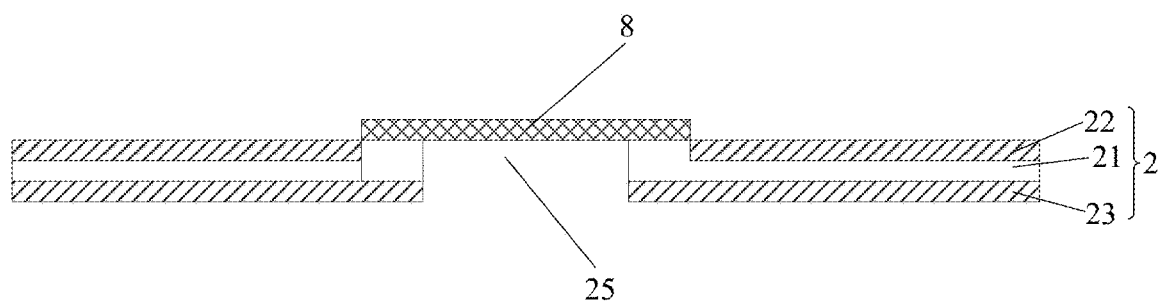
FIG. 7 is a second schematic structural diagram of a radio frequency circuit layer according to an embodiment of the present disclosure.
Figure 8:
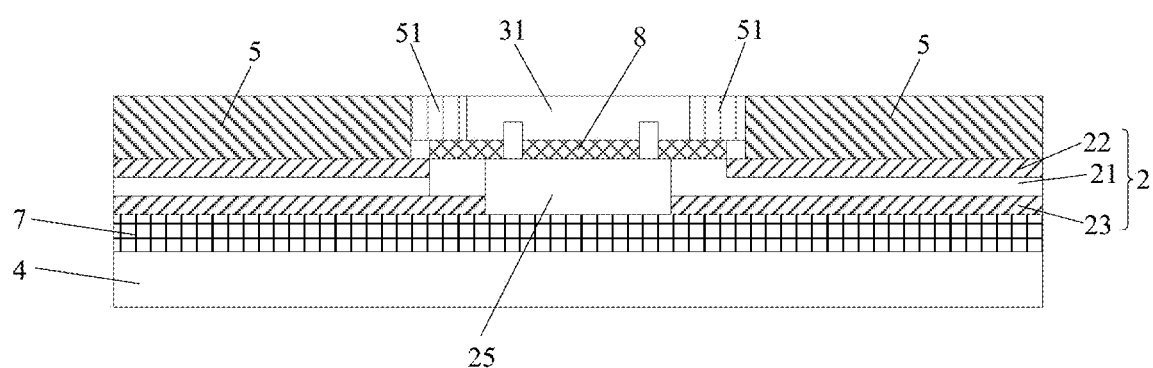
FIG. 8 is a second schematic diagram showing that a radio frequency circuit layer is connected to an antenna according to an embodiment of the present disclosure.

Example 2: As shown in FIG. 7 and FIG. 8, the middle frame 5 is provided with a first through hole, and an antenna feed point 31 is disposed on the inner wall of the first through hole. Optionally, the antenna feed point 31 is disposed on the inner wall of the first through hole by using plastic 51. The radio frequency circuit layer 2 is provided with a first opening 25, and the radio frequency line passes through the first opening 25 and is connected to the antenna feed point 31.

Optionally, the radio frequency line passes through the first opening 25 and is connected to the antenna feed point 31 by using a metal gasket 8.

Optionally, in a case that the radio frequency line passes through the first opening 25 and is connected to the antenna feed point 31 by using the metal gasket 8, the first opening 25 is an opening that penetrates the radio frequency circuit layer 2. The metal gasket 8 covers the first opening 25, a first surface of the metal gasket 8 is connected to the radio frequency line, and a second surface of the metal gasket 8 is connected to the antenna feed point 31.

Specifically, a first opening 25 is formed on the radio frequency circuit layer 2, and the first opening 25 penetrates the first ground layer 22, the radio frequency wiring layer 21 and the second ground layer 23.

Optionally, the metal gasket 8 is welded to the radio frequency circuit layer 2 by using the surface mount technology (Surface Mount Technology, SMT).

The metal gasket 8 is welded to one side of the first ground layer 22 and electrically connected to the radio frequency line in the radio frequency wiring layer 21. Because the metal gasket 8 is welded on the side of the radio frequency circuit layer 2 where the first ground layer 22 is located, the metal gasket 8 can be easily connected to the antenna feed point 31 on the middle frame 5.

The antenna feed point 31 in the metal middle frame 5 is welded to the metal gasket 8, and the first ground layer 22 is connected to the middle frame 5. Because the first opening 25 penetrates the first ground layer 22, the radio frequency wiring layer 21, and the second ground layer 23, a welding space is provided on a side of the radio frequency circuit layer 2 where the second ground layer 23 is located, to facilitate a welding operation. In addition, the antenna feed point 31 is welded to the metal gasket 8, so that the reliability of connection between the antenna 3 and the radio frequency circuit layer 2 is also ensured.

Optionally, the metal gasket 8 is welded on the radio frequency circuit layer 2 and is disposed protruding from a surface of the first ground layer 22. To ensure overall thickness of a combination of the radio frequency circuit layer 2 and the middle frame 5, the metal gasket 8 is located in the first through hole when the metal gasket 8 is welded to the antenna feed point 31, so as to avoid an increase in overall thickness of the terminal.

The radio frequency circuit layer 2 is disposed on the screen 4, for example, the second ground layer 23 is connected to the screen 4. Optionally, the radio frequency circuit layer 2 may alternatively be connected to the screen 4 by using foam 7, so as to provide support for the radio frequency circuit layer 2 through the foam 7.

In this embodiment, differing from a manner in which the antenna feed point 31 and the radio frequency line 210 are electrically connected by using a shrapnel, a manner in which the antenna feed point 31 and the radio frequency line are electrically connected by using the metal gasket 8 has the advantages that: a contact area between the radio frequency line 210 and the antenna feed point 31 is larger and the path is shorter, to avoid an unreliable contact of the antenna due to a small contact area caused by the shrapnel, and avoid that the antenna performance is affected by a parasitic parameter caused by a longer contact path between the radio frequency line 210 and the antenna feed point 31, thereby guaranteeing the reliability of connection between the antenna and the radio frequency line layer 2, and further guaranteeing the antenna performance.

Figure 9:
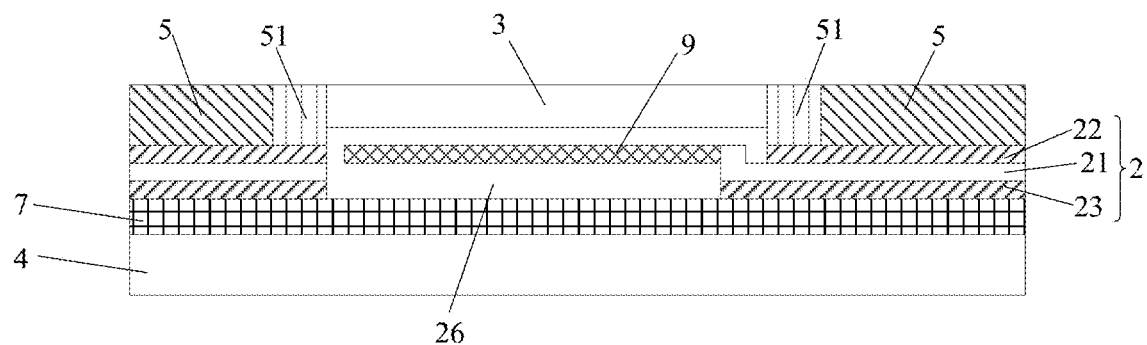
FIG. 9 is a third schematic diagram showing that a radio frequency circuit layer is connected to an antenna according to an embodiment of the present disclosure.

Example 3: As shown in FIG. 9, a feeding antenna 9 is disposed between the middle frame 5 and the screen 4. The feeding antenna 9 is connected to the radio frequency line and coupled to the antenna 3 disposed on the middle frame 5, to avoid a problem of poor contact reliability possibly exists in a case that the antenna feed point and the radio frequency line are connected through contact.

Optionally, the middle frame 5 is provided with a second through hole, and the antenna 3 is disposed on the inner wall of the second through hole. For example, the antenna 3 is disposed on the inner wall of the second through hole by using plastic 51.

The radio frequency circuit layer 2 is provided with a second opening 26, and the second opening 26 is an opening penetrating the radio frequency circuit layer 2. If the radio frequency circuit layer 2 includes a radio frequency wiring layer 21 provided with a plurality of radio frequency lines, a first ground layer 22 located on a first surface of the radio frequency wiring layer 21, and a second ground layer 23 located on a second side of the radio frequency wiring layer 21, the second opening may be an opening penetrating the first ground layer 22, the radio frequency wiring layer 21, and the second ground layer 23; and the feeding antenna 9 is located in the second opening 26.

Specifically, there is a gap between the antenna 3 on the middle frame 5 and the feeding antenna 9, and a size of the gap is within a preset distance range to ensure that the antenna 3 and the feeding antenna 9 can be coupled and connected, that is, the feeding antenna 9 can receive energy radiated by the antenna 3.

The second opening 26 penetrates the first ground layer 22, the radio frequency wiring layer 21, and the second ground layer 23, so that interference of the first ground layer 22 and the second ground layer 23 on the feeding antenna 9 can be prevented. In addition, the feeding antenna 9 is disposed in the second opening 26, so that the interference of the first ground layer 22 and the second ground layer 23 on the feeding antenna 9 can be prevented, and thickness requirements of a combination of the middle frame 5 and the radio frequency circuit layer 2 can be met, avoiding an increase of terminal thickness. In addition, because the radio frequency circuit layer 2 is located between the screen 4 and the middle frame 5, a distance between the radio frequency circuit layer 2 and the middle frame 5 is ensured to be consistent after assembly is completed.

Further, the radio frequency circuit layer 2 may alternatively be connected to the screen 4 by using foam 7, so as to provide support for the radio frequency circuit layer 2 through the foam 7.

In this embodiment, the radio frequency line in the radio frequency circuit layer 2 is coupled to the antenna 3 by using the feeding the antenna 9, to avoid an unreliable contact of the antenna due to a small contact area caused when the antenna feed point and the radio frequency line are electrically connected by using a shrapnel, and avoid that the antenna performance is affected by a parasitic parameter caused by a longer contact path between the radio frequency line and the antenna feed point, thereby guaranteeing the reliability of connection between the antenna 3 and the radio frequency line layer 2, and further guaranteeing the antenna performance.

The following further describes a possible connection mode of the radio frequency circuit layer 2 and the main board 1 in the foregoing embodiments.

Figure 10:
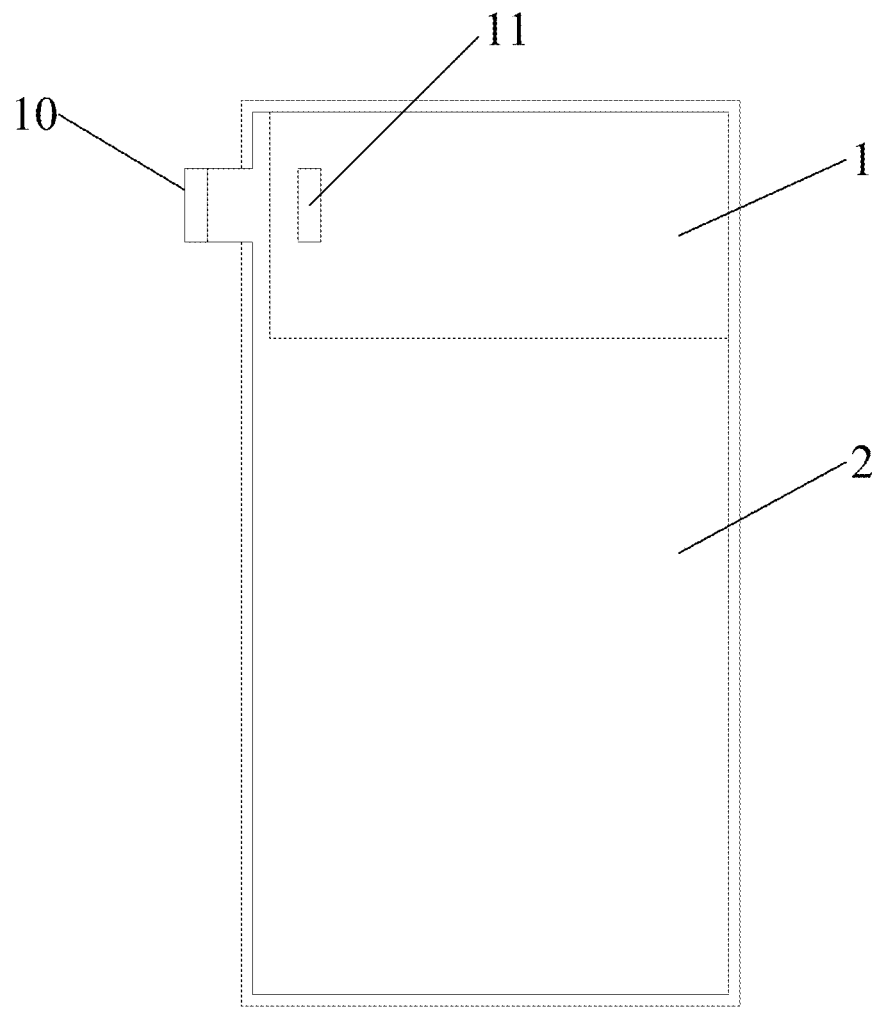
FIG. 10 is a schematic diagram showing that a radio frequency circuit layer is connected to a main board according to an embodiment of the present disclosure.

As shown in FIG. 10, the radio frequency circuit layer 2 is connected to the main board 1 by using a board-to-board connector 10.

Specifically, the radio frequency circuit layer 2 is adjacent to a first surface of the middle frame 5, and the main board 1 is adjacent to a second surface of the middle frame 5. Optionally, the radio frequency circuit layer 2 is disposed on the first surface of the middle frame 5, the main board 1 is disposed on the second surface of the middle frame 5, and the first surface and the second surface are arranged opposite to each other.

The middle frame 5 is provided with a third opening, and the board-to-board connector 10 passes through the third opening and is separately connected to the radio frequency circuit layer 2 and the main board 1.

Optionally, the board-to-board connector 10 is disposed on the radio frequency circuit layer 2. The radio frequency circuit layer 2 is made of an LCP soft board and can be bent. The part of the bent radio frequency circuit layer 2 ensures that the board-to-board connector 10 passes through the third opening and is fastened to a connector seat 11 on the main board 1.

In this solution, based on the radio frequency circuit layer 2, it can be ensured that an antenna 3 at any position can be connected to the radio frequency circuit layer 2 directly or by using a relatively short line, avoiding a case that large internal space of the terminal is occupied by connection of a radio frequency coaxial line to an antenna feed point because there are a large quantity of antennas 3 and the antennas 3 are far away from the main board 1. In addition, an unreliable contact of the antenna can be avoided due to a small contact area caused when the antenna feed point and the radio frequency line are electrically connected by using a shrapnel, and that the antenna performance is affected by a parasitic parameter caused by a longer contact path between the radio frequency line and the antenna feed point can be avoided, thereby guaranteeing the reliability of connection between the antenna 3 and the radio frequency line layer 2, and further guaranteeing the antenna performance.

All embodiments in this specification are described in a progressive manner. Each embodiment focuses on differences from other embodiments. For the part that is the same or similar between different embodiments, reference may be made between the embodiments.

Although some optional embodiments in the embodiments of the present disclosure have been described, persons skilled in the art can make changes and modifications to these embodiments once they learn the basic inventive concept. Therefore, the following claims are intended to be construed as to cover optional embodiments and all changes and modifications falling within the scope of the embodiments of the present disclosure.

Finally, it should be noted that in this specification, relational terms such as first and second are only used to distinguish one entity or operation from another, and do not necessarily require or imply that any actual relationship or sequence exists between these entities or operations. Moreover, the terms "include", "comprise", or any of their variants are intended to cover a non-exclusive inclusion, so that a process, a method, an article, or a terminal device that includes a list of elements not only includes those elements but also includes other elements that are not listed, or further includes elements inherent to such a process, method, article, or terminal device. In absence of more constraints, an element preceded by "includes a . . . " does not preclude the existence of other identical elements in the process, method, article, or terminal device that includes the element.

The foregoing descriptions are merely optional implementations of the present disclosure. It should be noted that a person of ordinary skill in the art may further make some improvements and refinements without departing from the principles of the present disclosure, and these improvements and refinements also fall within the protection scope of the present disclosure.

What is claimed is:

1. A terminal, comprising a main board, a middle frame, a radio frequency circuit layer, a screen, and a plurality of antennas, wherein
    the middle frame is located between the main board and the radio frequency circuit layer, the radio frequency circuit layer is located between the screen and the middle frame, and the plurality of antennas are connected to the main board by using radio frequency lines in the radio frequency circuit layer;
    wherein the radio frequency circuit layer comprises:
    a radio frequency wiring layer provided with a plurality of the radio frequency lines, wherein each of the antennas is connected to the main board by using a corresponding radio frequency line;
    a first ground layer located on a first side of the radio frequency wiring layer, wherein the first ground layer is connected to the middle frame; and
    a second ground layer located on a second side of the radio frequency wiring layer, wherein the second ground layer is connected to the screen.

2. The terminal according to claim 1, wherein the radio frequency circuit layer at least partially covers an area on the screen at a predetermined distance from an edge of the screen.

3. The terminal according to claim 1, wherein the middle frame is provided with a first through hole, and an antenna feed point of the antenna is disposed on the inner wall of the first through hole; and
    the radio frequency circuit layer is provided with a first opening, and the radio frequency line passes through the first opening and is connected to the antenna feed point.

4. The terminal according to claim 3, wherein the radio frequency line passes through the first opening and is connected to the antenna feed point by using silver glue or a metal gasket.

5. The terminal according to claim 4, wherein in a case that the radio frequency line passes through the first opening and is connected to the antenna feed point by using the silver glue, the first opening is an opening penetrating the first ground layer; and the first through hole is filled with the silver glue.

6. The terminal according to claim 5, wherein there is a gap between the antenna feed point and the radio frequency line.

7. The terminal according to claim 4, wherein in a case that the radio frequency line passes through the first opening and is connected to the antenna feed point by using the metal gasket, the first opening is an opening that penetrates the radio frequency circuit layer; and
    the metal gasket covers the first opening, a first surface of the metal gasket is connected to the radio frequency line, and a second surface of the metal gasket is connected to the antenna feed point.

8. The terminal according to claim 1, wherein a feeding antenna is disposed between the middle frame and the screen, and the feeding antenna is connected to the radio frequency line and coupled with the antenna disposed on the middle frame.

9. The terminal according to claim 8, wherein the middle frame is provided with a second through hole, and the antenna is disposed on the inner wall of the second through hole; and
    the radio frequency circuit layer is provided with a second opening, the second opening is an opening penetrating the radio frequency circuit layer, and the feeding antenna is located in the second opening.

10. The terminal according to claim 1, wherein the radio frequency circuit layer is connected to the main board by using a board-to-board connector.

11. The terminal according to claim 10, wherein the radio frequency circuit layer is adjacent to a first surface of the middle frame, the main board is adjacent to a second surface of the middle frame, and the first surface and the second surface are arranged opposite to each other; and
    the middle frame is provided with a third opening, and the board-to-board connector passes through the third opening and is separately connected to the radio frequency circuit layer and the main board.

12. The terminal according to claim 1, wherein the radio frequency circuit layer is connected to the screen by using foam.

* * * * *